J. H. HEMPEN.
CAKE TRIMMER.
APPLICATION FILED JULY 23, 1909.

949,149.

Patented Feb. 15, 1910.

Witnesses
Jos. F. Collins.
Wm Jn Birney.

Inventor
J. H. Hempen
By Wallace Greene,
Attorney,

UNITED STATES PATENT OFFICE.

JOHN H. HEMPEN, OF ALEXANDRIA, LOUISIANA, ASSIGNOR OF ONE-HALF TO WALTER GOODMAN, OF MEMPHIS, TENNESSEE.

CAKE-TRIMMER.

949,149.  Specification of Letters Patent.  Patented Feb. 15, 1910.

Application filed July 23, 1909. Serial No. 509,207.

*To all whom it may concern:*

Be it known that I, JOHN H. HEMPEN, citizen of the United States, residing at Alexandria, in the parish of Rapides and State of Louisiana, have invented certain new and useful Improvements in Cake-Trimmers, of which the following is a specification, reference being had therein to the accompanying drawing.

The object of this invention is to provide a very simple and inexpensive oil-meal cake trimmer which can be made or repaired in any ordinary machine shop, using only common stock materials, and which has its trimming device arranged to automatically follow the contour of the harder portions of the cake, removing only the portions that lack proper density, and which is further arranged to be readily adjusted to any desired limit of hardness.

Figure 1:
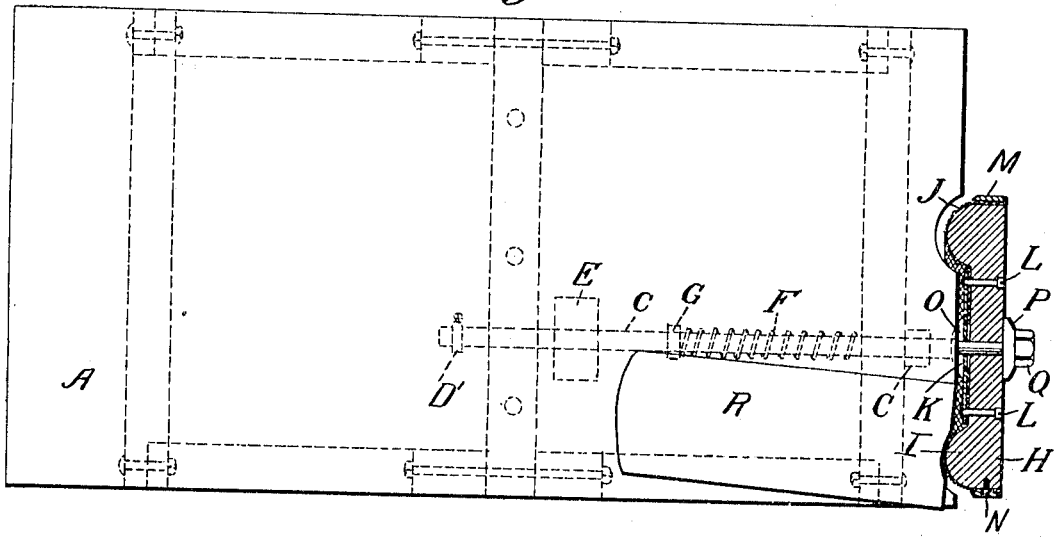
Figure 2:
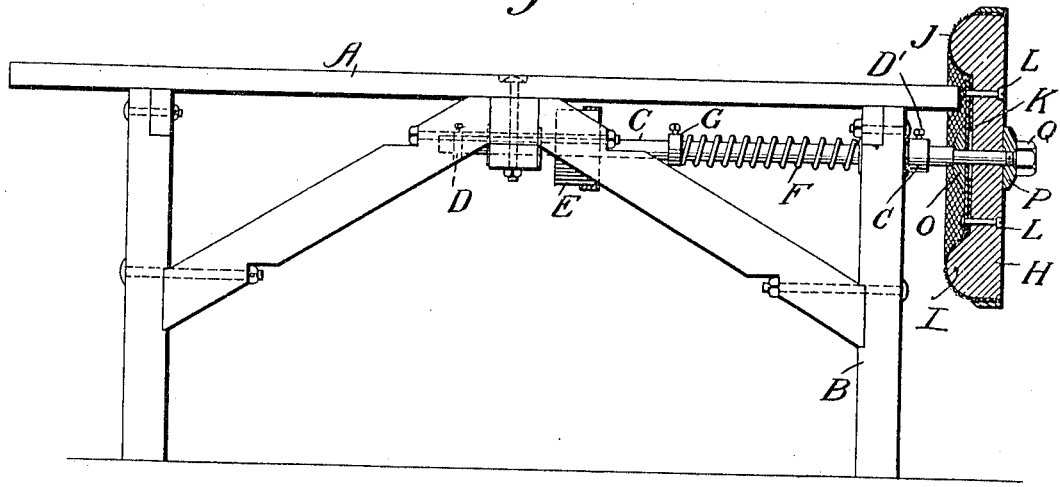

In the accompanying drawings, Figure 1 is a plan view of the apparatus, parts being broken away. Fig. 2 is a side elevation of the same apparatus, the trimming wheel being shown in vertical, diametrical section.

In these views, A represents the plane top of a table and B any suitable rigid supporting frame, the table and frame being usually of wood. Below the table top and parallel thereto is a shaft C mounted to slide longitudinally and to rotate in bearings borne by the table. The sliding movement is limited by adjustable collars D, D', and the rotation is produced by means of a belt pulley E which has a face broad enough to allow the sliding movement of the shaft without displacing the driving belt. Normally, the shaft is at the inner limit of its sliding path and its movement from this position is resisted by any suitable spring which may be a spring F coiled about the shaft and lying between one bearing and a collar G adjustably fixed to the shaft itself. The free end of the shaft itself projects slightly beyond the end of the table and upon this end portion is fixed a trimming wheel H, usually made of one or more pieces of wood and provided, upon the face next the table with a heavy marginal rib I of curved cross section. This rib is provided with abrading or cutting devices, shown in this instance as of wire, the rib being overlaid with a closely fitting wire netting J, conveniently formed by using an annular disk of wire netting having its inner marginal portion drawn down against the body of the wheel by a metal plate K secured by bolts L, and having its outer margin drawn down about the periphery of the wheel and secured by a tire-like metal band M, itself secured in any suitable way, as by screws N. The complete wheel is clamped between disks O, P upon the shaft by means of a nut Q. When in place, the body of the wheel lies near the end of the table, which is cut away to accommodate the rib, and the parts are so proportioned that the highest point of the inner margin of the rib is nearly in the plane of the upper surface of the table, and hence that portion of the rib exposed above the table travels approximately parallel to the latter.

In use, the shaft being in rotation a cake is placed upon the table and gently pressed toward the trimming wire-covered rib by the operator. The wire grinds off the softer portions very rapidly and by its movement nearly parallel to the table tends constantly to so turn the cake as to present a fresh portion. When the trimmer meets any portion having such density as to press the trimmer outward strongly, the spring yields, the shaft slides and the trimming wheel recedes, to return as soon as the denser portion is passed, and thus the softer portions are removed, the trimmer automatically moving back and forth and following the contour of the denser portions, the operator having only to press the cake toward the trimmer and by slight force govern its rate of rotation.

Practically, the machine has nothing likely to get out of order, and in any case any part may be removed, replaced, renewed, or repaired without sending to a great distance for special parts, and practically also it can be operated by persons entirely without mechanical skill.

What I claim is:

1. In oil-cake trimming apparatus, the combination with a cake-supporting table, of a trimming wheel mounted to rotate in a plane transverse to the plane of the table and in position for abrading the margin of a cake resting thereon, and devices yieldingly resisting bodily outward movement of the wheel under pressure of the cake against the same.

2. In oil-cake trimming apparatus, the combination with a cake-supporting table adapted to permit free movement of a cake thereon in any direction, of a cake trimming wheel rotating, in a plane transverse to the plane of the table, alongside the place of the cake thereon, and a spring yieldingly resisting the bodily movement of the wheel under pressure of the cake against its lateral face.

3. In apparatus of the class described, the combination with a cake supporting table, of a shaft below the top of the table projecting beyond its margin and mounted to rotate and to slide longitudinally, a trimming wheel fixed to said shaft beyond the table's margin and having one side projecting above the table, and a spring yieldingly resisting longitudinal outward movement of the shaft.

4. In apparatus of the class described, the combination with a cake supporting table, a shaft mounted below the top of the table to rotate and to slide longitudinally, an abrading wheel carried by the shaft, having one side projecting above the top of the table lying outside its margin, and provided with an annular marginal rib upon one of its lateral faces, and a spring yieldingly resisting the longitudinal outward movement of the shaft.

5. In apparatus of the class described, the combination with a cake supporting table, of a shaft mounted to rotate and to slide longitudinally below the top of the table, a wheel fixed to the shaft, provided with a lateral marginal rib covered with wire netting, and having one side projecting above the table, and a spring yieldingly resisting the sliding of the shaft in one direction.

In testimony whereof I affix my signature in presence of two witnesses.

JOHN H. HEMPEN.

Witnesses:
D. GUEPPEY,
H. COMER.